March 19, 1935. E. J. RILEY 1,994,730
APPARATUS FOR COOLING OR HEATING OIL OR THE LIKE
Filed July 28, 1933 2 Sheets-Sheet 2
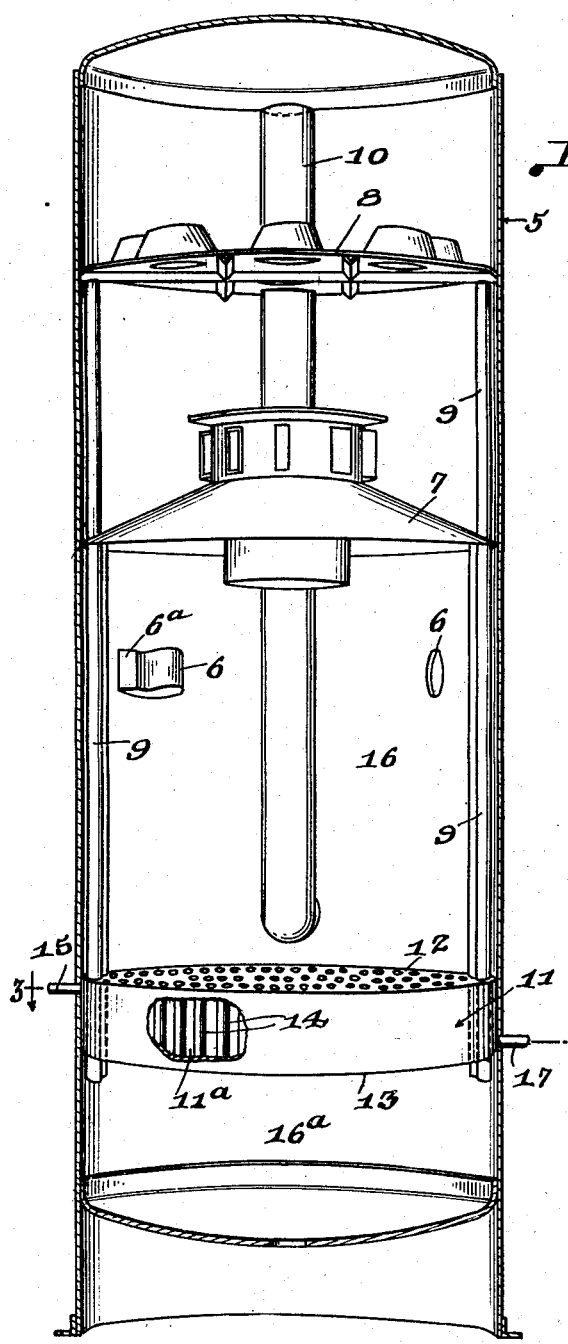
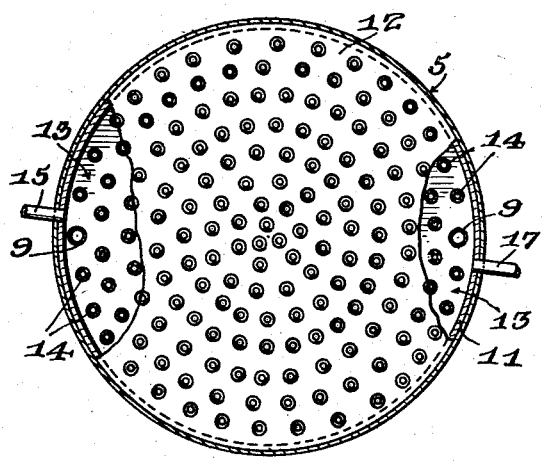
Inventor
E. J. Riley
By Barry + Cyr
Attorneys Patented Mar. 19, 1935

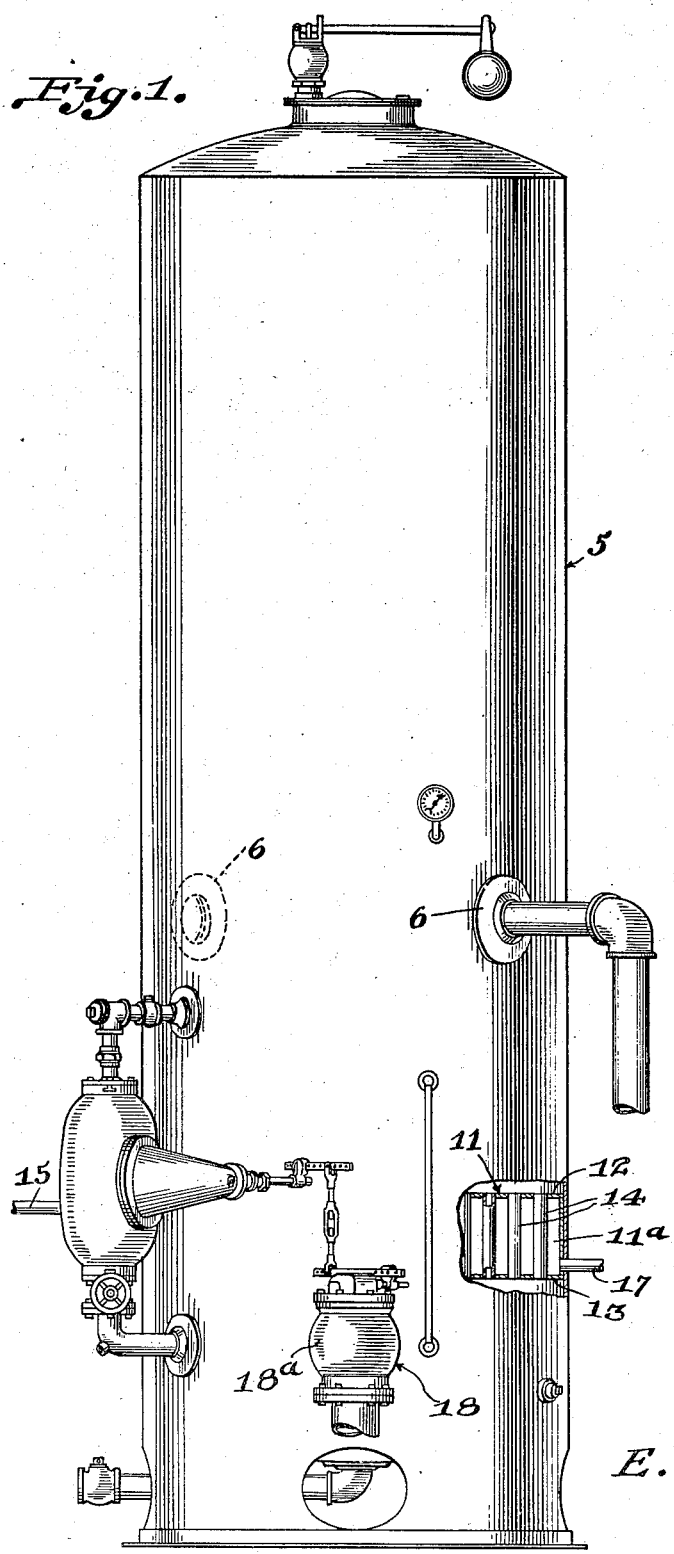

1,994,730

UNITED STATES PATENT OFFICE 1,994,730

APPARATUS FOR COOLING OR HEATING OIL OR THE LIKE

Edward J. Riley, Tulsa, Okla., assignor to Smith Separator Corporation, Tulsa, Okla., a corporation of Oklahoma Application July 28, 1933, Serial No. 682,719

2 Claims. (Cl. 62—122)

This invention relates to improvements in oil and gas separators or the like, and more particularly to a novel apparatus for treating an admixture of oil and gas in which water may be present.

The primary purpose of the invention is to subject an admixture of oil and gas, with or without water, to treatment within a separator or the like for the purpose of obtaining oil of predetermined and improved characteristics.

Another object is to provide a separator or the like for use in treating oil admixtures, having means for subjecting the material being treated to indirect heat exchange with suitable cooling or heating mediums.

A further object is to furnish a separator or the like with a heat exchange element having an expansion chamber therein, and to introduce gas under high pressure into said expansion chamber for cooling a fluid passing through said heat exchange element.

A still further object is to furnish a separator or the like with a heat exchange element provided with a plurality of open ended pipes in which the oil passing therethrough is indirectly subjected to cooling or heating mediums.

With the foregoing objects outlined and with other objects in view which will appear as the description proceeds, the invention consists in the novel features hereinafter described in detail, illustrated in the accompanying drawings, and more particularly pointed out in the appended claims.

In the drawings,

Fig. 1 is a front elevation of one embodiment of my improved separator with parts broken away to facilitate illustration.

Fig. 2 is a longitudinal vertical sectional view through the separator, with certain parts in perspective; a portion of the heat exchange element being broken away to facilitate illustration.

Fig. 3 is a top plan view of the heat exchange element with portions broken away.

Referring to the drawings, 5 designates a closed tank or separator casing in which a fluid mixture, (normally oil and gas), but sometimes containing a percentage of water, is introduced from the well. This mixture may be produced from the well and introduced into the separator or vessel by the natural gas pressure from the well, or the mixture may be pumped from the well by any suitable means such as a pump, not shown. One or more centrifugal inlet boxes 6, each having an outlet opening 6a, and arranged substantially centrally of the height of the casing, is provided for the introduction of the mixture to the separator and also for the purpose of swirling the mixture around the inside surface of the casing. As the mixture swirls around within the casing, the heavier hydrocarbons contained in the mixture will drop into the oil pool at the lower portion of the separator, while the lighter hydrocarbons, such as gas, will rise to the upper portion of the separator where they will contact with the baffles or scrubbing elements 7 and 8 which may be suitably connected to the inner walls of the casing by welding or the like. In this manner, the oil particles remaining in the lighter hydrocarbons rising to the top of the separator will be extracted by means of the scrubbing elements and drain back to the lower portion of the separator through the series of drain pipes 9 arranged along the inner walls of the casing. At the same time, the gas or lighter hydrocarbons resulting from the separation may be discharged from the separator through the gas outlet conduit 10.

A closed heat exchanger, designated generally by the numeral 11, is arranged in the lower portion of the separator, preferably below the oil level therein, and divides the casing into an upper compartment 16 and a lower compartment 16a. This heat exchange element 11 may be constructed on the principle of a fire tube boiler, that is, it may have an upper horizontal flue sheet 12 and a lower horizontal flue sheet 13. These flue sheets are normally spaced apart and are preferably welded to the inner walls of the casing to form a gas tight expansion chamber 11a. A plurality of spaced open-ended pipes or tubes 14 are vertically disposed between said upper and lower flue sheets, and these pipes may either be rolled in the sheets, as in the construction of fire tube boilers, or welded to said upper and lower flue sheets.

I have found in actual practice, that the heat exchanger 11 may serve the purpose of a refrigerating chamber for the crude oil, as well as a heat treating element for said crude oil.

For the purpose of cooling the oil in the heat exchanger 11, a suitable gas such as comparatively dry natural gas is injected into the expansion chamber 11a at high pressure through the inlet tube 15 arranged at one side of the separator, adjacent the upper portion of the heat exchanger 11. This gas will expand and circulate in the chamber 11a between the series of pipes 14 and be discharged from the chamber through the outlet pipe 17 adjacent the lower portion of the heat exchanger 11. As seen from the drawings, the inlet and outlet for the heat exchanger are arranged preferably at opposite sides of the casing.

During the circulation of the gas through the heat exchanger, the energy produced due to the expansion of the gas will provide the heat absorption necessary for refrigeration, and therefore, the gas will be the medium by which the heat will be removed from the oil. In other words, in cooling the oil, it will be necessary that the heat be transferred from the oil to the cool gas, and consequently, the series of pipes 14 will act as the heat exchange medium, with the result that the greater percentage of heat will be removed from the oil by conduction while said oil is passing through the pipes 14 in the cooling element or heat exchanger.

As above stated, after the expanded gas has given up its cooling energy in the expansion chamber 11a, it will leave the separator through the outlet pipe 17, and in order to prevent any waste of this gas, it can be further utilized for lease and domestic purposes.

With a heat exchanger of the character above described, employing natural gas as the refrigerant, I have found that the apparatus will permit the attainment of temperatures sufficient to hold the molecules of gas such as pentane, butane, propane and others in the solution of the oil in the lower portion of the separator or tank, with the result that the gravity of the oil will be increased, as will also its anti-knock value. This oil can be discharged from the separator by means of a float operated valve 18a through the outlet 18, and it will have a greater commercial value, as higher gravity crude oil is more desirable for refining purposes.

The temperature within the heat exchanger 11 may be controlled by any suitable conventional type of thermostatic control, (not shown).

The use of natural gas as a refrigerant in connection with a heat exchanger of the type herein described will prevent the present great loss of the lighter oil fractions which are now being lost in the present conventional method of discharging oil from a separator into the stock tanks at higher temperatures. Cooling the oil and retaining the lighter fractions will have the same effect as holding a high pressure on stock tanks, thereby avoiding loss due to evaporation. However, as some of the results obtained by cooling the oil in the separator with the heat exchanger 11 will be lost after the oil is discharged from the separator and while it is in the stock tanks, it is manifest that the present heat exchanger may also be employed in oil storage tanks, as well as all other types of tanks and vessels used for the storage of crude oil.

It is well known that crude oils are subject to emulsions, which consist of a collection of minute globules of oil surrounded by films of water, or globules of water enclosed in films of oil. In one case the water is the enclosing film or outside phase, and in the latter case, the film is the oil. These globules or small drops being surrounded by this film keeps them from coalescing and breaking through the film so as to release the free oil and water. The application of heat is the most effective method of breaking up these emulsions. Heat decreases the viscosity of the oil, thereby weakening the film to the point of rupture. Heat also expands the droplet within its enclosing film, developing enough pressure to bring about the rupture of its covering or film. Therefore, heat treatment is necessary in order to make such crude oils fit for pipe line transportation or refining.

The apparatus described above in connection with the refrigeration of the crude oil may also be employed for the heat treatment of such oil. The fluid mixture, containing gas, oil and water, will be introduced and separated in the separator 5 in the same manner as explained in the foregoing. However, in order to further separate the mixture and break up the emulsions, I propose to introduce live steam into the expansion chamber 11a of the heat exchanger 11, through the inlet 15. The steam is circulated in the chamber 11a between the series of pipes 14 and is discharged through the outlet 17. Thus it will be seen that the live steam will come in contact with the pipes 14 containing the oil, and thereby furnish the heat necessary to break up the emulsion, with the result that cut crude oil fit for pipe line transportation or refining will be discharged from the lower portion of the separator or tank through the outlet 18 by means of the automatic oil valve 18a.

While I have disclosed my improved heat exchanger in connection with an oil and gas separator, it is manifest that similar oil treatments may be effected with my device applied to oil storage tanks, and in fact, all vessels containing crude oil.

From the foregoing it is believed that the construction, operation and advantages of the invention may be readily understood, and it is apparent that changes may be made in the details disclosed, without departing from the spirit of the invention, as expressed in the claims.

What I claim and desire to secure by Letters Patent is:

1. An apparatus of the character described, comprising a casing adapted to contain a body of liquid in the bottom portion thereof, the remainder of said casing forming a vapor chamber, a closed heat exchange element arranged within said casing below the liquid level therein, said heat exchange element being provided with a plurality of spaced open-ended tubular elements for the passage of the liquid therethrough, an inlet in said heat exchange element for the introduction of a fluid into the latter, an outlet in said heat exchange element for discharging said fluid therefrom, and superposed baffles mounted in the casing and arranged within said vapor chamber.

2. An apparatus for treating an admixture of fluids, comprising a casing, an inlet for the fluid mixture arranged substantially centrally of the casing, a heat exchange element secured to the inner walls of said casing below said inlet and below the liquid level in said casing, said element including a closed expansion chamber, a plurality of spaced open-ended tubular elements arranged within said chamber for the passage of the admixture of fluids therethrough, an inlet in said chamber for introducing a second fluid in said expansion chamber into contact with said tubular elements for effecting a heat exchange relationship between the two fluids, an outlet for discharging said second fluid from said chamber, and an outlet below said heat exchange element for discharging the treated fluid admixture from the casing.

EDWARD J. RILEY.